United States Patent
Xu et al.

(10) Patent No.: US 10,923,136 B2
(45) Date of Patent: Feb. 16, 2021

(54) SPEECH EXTRACTION METHOD, SYSTEM, AND DEVICE BASED ON SUPERVISED LEARNING AUDITORY ATTENTION

(71) Applicant: INSTITUTE OF AUTOMATION, CHINESE ACADEMY OF SCIENCES, Beijing (CN)

(72) Inventors: Jiaming Xu, Beijing (CN); Yating Huang, Beijing (CN); Bo Xu, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 16/645,447

(22) PCT Filed: Apr. 19, 2019

(86) PCT No.: PCT/CN2019/083352
§ 371 (c)(1),
(2) Date: Mar. 6, 2020

(87) PCT Pub. No.: WO2020/124902
PCT Pub. Date: Jun. 25, 2020

(65) Prior Publication Data
US 2020/0402526 A1 Dec. 24, 2020

(30) Foreign Application Priority Data
Dec. 19, 2018 (CN) .......................... 2018 1 1558212

(51) Int. Cl.
*G10L 25/30* (2013.01)
*G10L 21/0208* (2013.01)

(52) U.S. Cl.
CPC .......... *G10L 21/0208* (2013.01); *G10L 25/30* (2013.01); *G10L 2021/02087* (2013.01)

(58) Field of Classification Search
CPC ..... G10L 21/0208; G10L 25/90; G10L 15/02; G10L 21/0272; G10L 19/02
(Continued)

(56) References Cited

U.S. PATENT DOCUMENTS 5,907,826 A * 5/1999 Takagi ................ G10L 15/1807
704/208
5,930,747 A * 7/1999 Iijima ..................... G10L 25/90
704/207
(Continued)

FOREIGN PATENT DOCUMENTS

CN    105448302 A    3/2016
CN    108680245 A    10/2018
(Continued)

OTHER PUBLICATIONS

Douglas O'Shaughnessy, "Speech Analysis," in Speech Communications: Human and Machine , IEEE, 2000, pp. 173-227, doi: 10.1109/9780470546475.ch6. (Year: 2000) (Year: 2000).*
(Continued)

*Primary Examiner* — Bharatkumar S Shah
(74) *Attorney, Agent, or Firm* — Bayramoglu Law Offices LLC

(57) ABSTRACT

A speech extraction method based on the supervised learning auditory attention includes: converting an original overlapping speech signal into a two-dimensional time-frequency signal representation by a short-time Fourier transform to obtain a first overlapping speech signal; performing a first sparsification on the first overlapping speech signal, mapping intensity information of a time-frequency unit of the first overlapping speech signal to preset D intensity levels, and performing a second sparsification on the first overlapping speech signal based on information of the preset D intensity levels to obtain a second overlapping speech signal; converting the second overlapping speech signal into a pulse signal by a time coding method; extracting a target pulse from the pulse signal by a trained target pulse extraction network; converting the target pulse into a
(Continued)

time-frequency representation of the target speech to obtain the target speech by an inverse short-time Fourier transform.

10 Claims, 4 Drawing Sheets

(58) Field of Classification Search
USPC .......................................................... 704/236
See application file for complete search history.

(56) References Cited

U.S. PATENT DOCUMENTS

2014/0328487 A1* 11/2014 Hiroe .................. G10L 21/0272
381/56
2017/0061978 A1* 3/2017 Wang .................. G10L 21/0232

FOREIGN PATENT DOCUMENTS

| CN | 108899048 | A | | 11/2018 | |
|----|-----------|---|---|---------|---|
| CN | 109448749 | A | | 3/2019 | |
| KR | 20110044990 | A | * | 5/2011 | ......... G10L 21/0208 |

OTHER PUBLICATIONS

P. Chandrasekaran, M. Bodruzzaman, G. Yuen and M. Malkani, "Speech recognition using pulse coupled neural network," Proceedings of Thirtieth Southeastern Symposium on System Theory, Morgantown, WV, USA, 1998, pp. 515-519, doi: 10.1109/SSST. 1998.660127. (Year: 1998).*

* cited by examiner

SPEECH EXTRACTION METHOD, SYSTEM, AND DEVICE BASED ON SUPERVISED LEARNING AUDITORY ATTENTION

CROSS REFERENCE TO THE RELATED APPLICATIONS

This application is the national phase entry of International Application No. PCT/CN2019/083352, filed on Apr. 19, 2019, which is based upon and claims priority to Chinese Patent Application No. 201811558212.6, filed on Dec. 19, 2018, the entire contents of which are incorporated herein by reference.

TECHNICAL FIELD

The present disclosure relates to the technical field of speech separation, and more particularly, relates to a speech extraction method, system, and device based on a supervised learning auditory attention.

BACKGROUND

The "cocktail party problem" is a challenging problem in the field of computer speech recognition, and the speech recognition technology in the prior art can accurately recognize the speech spoken by one person. Existing speech recognition technology for recognizing two or more persons, however, is significantly less accurate. Many speech separation algorithms are devoted to solving the "cocktail party problem". Since deep learning is successfully applied in various fields of artificial intelligence, many researchers have applied the artificial neural networks to model the "cocktail party problem". In traditional artificial neural networks, the stimuli are encoded by rate coding. Recent studies, however, indicate that rate coding ignores the time structure, which is oversimplified and thus has a low accuracy of recognizing speech. It is called time coding because during coding, the time structure is used to code the information. Because there are temporal and spatial structures in the speech, the spiking neural network with the time series information of pulse sequences is employed to model the "cocktail party problem", which is considered as a new solution. However, the spiking neural networks use unsupervised learning algorithms and thus can only separate some simple overlapping speeches such as two separated voices /Di/ and /Da/. When some complex speeches are overlapped, the accuracy rate cannot reach a satisfactory level.

By means of supervised learning, however, distinguishable models can be learned from the training corpus, and several supervised learning algorithms for the spiking neural networks have met with some success. The spiking neural network with the time series information of pulse sequences, therefore, is trained by a supervised learning algorithm when modeling the "cocktail party problem", which facilitates the spiking neural network to separate the complex and continuous overlapping speech.

In general, compared to traditional artificial neural networks and spiking neural networks with unsupervised learning algorithms, the above-mentioned overlapping speech separation method based on the supervised learning algorithm achieves significant improvement in extracting and separating the overlapping speech, but the convergence process is slow, and the accuracy of the speech extraction needs to be further improved.

SUMMARY

In order to solve the above-mentioned problems in the prior art, that is, to improve the accuracy of overlapping speech separation, the present disclosure provides a speech extraction method based on a supervised learning auditory attention, including:

step S10, converting an original overlapping speech signal into a two-dimensional time-frequency signal representation by a short-time Fourier transform (STFT) to obtain a first overlapping speech signal;

step S20, performing a first sparsification on the first overlapping speech signal, mapping intensity information of a time-frequency unit of the first overlapping speech signal to preset D intensity levels, and performing a second sparsification on the first overlapping speech signal based on information of the intensity levels to obtain a second overlapping speech signal;

step S30, converting the second overlapping speech signal into a pulse signal by a time coding method; wherein the time coding method includes time-rate coding or time-population coding;

using the time coding method to retain time series information of a speech, learning a mapping function from a noisy feature to a separated target (e.g., an ideal masking or an amplitude spectrum of an interesting speech) by a spiking neural network configured to process the time series information, which greatly improves the accuracy of speech separation;

step S40, extracting a target pulse from the pulse signal by a trained target pulse extraction network; wherein the trained target pulse extraction network is constructed based on the spiking neural network;

step S50, converting the target pulse into a time-frequency representation of the target speech to obtain the target speech by an inverse short-time Fourier transform.

In some preferred embodiments, in step S10, the step of "converting the original overlapping speech signal into the two-dimensional time-frequency signal representation by the short-time Fourier transform" includes:

step S11, resampling the original overlapping speech signal to reduce the sampling rate of the original overlapping speech signal;

step S12, encoding the resampled overlapping speech signal by the short-time Fourier transform; encoding the speech signal into a matrix representation containing a time dimension and a frequency dimension; and using each time-frequency set as a time-frequency unit.

In some preferred embodiments, in step S20, the step of "performing the first sparsification on the first overlapping speech signal, mapping the intensity information of the time-frequency unit of the first overlapping speech signal to the preset D intensity levels, and performing the second sparsification on the first overlapping speech signal based on the information of the intensity levels" includes:

step S21, based on a preset background noise threshold, selecting a plurality of time-frequency units from the time-frequency unit of the first overlapping speech signal to form a first time-frequency unit set; wherein the plurality of time-frequency units are greater than the preset background noise threshold;

step S22, performing K-means clustering on the plurality of time-frequency units of the time-frequency unit set, and mapping the plurality of time-frequency units of the first time-frequency unit set to the preset D intensity levels;

step S23, setting a time-frequency unit with a lowest intensity level as a mute unit to obtain a second overlapping speech signal.

In some preferred embodiments, the time-rate coding method includes:

using the number of pulses and a releasing time in a coding window to reflect an intensity of the time-frequency unit; wherein the intensity level in a sparse mapping module is D; the time-frequency unit with the lowest intensity level is set as the mute unit; intensities of the plurality of time-frequency units are mapped to an intensity of 0<d<D after being subjected to the K-means clustering, where d is an integer; the time-frequency unit ($t_0$, $f_0$) corresponds to a time window of a neuron i, wherein the time window has a starting time of $t_0$; a time span is $\Delta t$; then, a pulse is respectively released at $$t_0 + \frac{\Delta t}{d} * l, l = 0, 1, \ldots, d-1$$

within the time span in the coding window having the starting time of $t_0$, and a total of d pulses are released.

In some preferred embodiments, the time-population coding includes:

using a plurality of neuronal populations to encode the intensity of the time-frequency unit; wherein pulses of the intensity information of the time-frequency unit are distributed in the coding windows of neurons corresponding to the plurality of neuronal populations; the intensity level in the sparse mapping module is D; the time-frequency unit with the lowest intensity level is set as the mute unit; the time-population coding uses D−1 neuronal populations to perform coding; the intensities of the plurality of time-frequency units are mapped to the intensity of 0<d<D after being subjected to the K-means clustering, where d is an integer; the time-frequency unit ($t_0$, $f_0$) corresponds to the time window of the neuron i in each neuronal population, wherein the time window has a starting time of $t_0$; the neuron i∈$P_l$, l=1, 2, . . . , d; a pulse is respectively released at the starting time $t_0$ of the time window, and a total of d pulses are released, wherein $P_l$ represents the $l^{th}$ neuronal population.

In some preferred embodiments, the target pulse extraction network is a two-layer fully connected spiking neural network constructed by a stochastic linear neuron model.

The weights of the target pulse extraction network are trained by a remote supervised method. The weight $\Delta w_{ji}(t)$ between the output layer neuron j and the input layer neuron i of the target pulse extraction network at time t is obtained by the following formula:

$$\Delta w_{ji}(t) = [S_j^d(t) - S_j^a(t)][a + \int_0^\infty W(s) S_i(t-s) ds]$$

where, $S_j^d(t)$, $S_j^a(t)$ and $S_i(t)$ represent, respectively, an expected output pulse sequence, an actual output pulse sequence and an input pulse sequence; a represents a non-Hebbian term; W(s) represents a learning window; and the weight of the target pulse extraction network is obtained by integrating $\Delta w_{ji}$ over time.

In some preferred embodiments, the learning window W(s) is as follows:

$$W(s) = \begin{cases} +A \cdot \exp\left(-\frac{s}{\tau_{win}}\right), & s > 0 \\ 0, & s \leq 0 \end{cases}$$

where, s represents a time span between a releasing time of a postsynaptic pulse and a releasing time of a presynaptic pulse; A represents an amplitude, and A>0; and $\tau_{win}$ represents a time constant of the learning window.

In some preferred embodiments, the remote supervised method is a remote supervised method with momentum (ReSuMe-M) or a remote supervised method with Nesterov's accelerated gradient (ReSuMe-NAG).

When the remote supervised method with momentum is used, the weight $w_{ji}^{k+1}$ between the output layer neuron j and the input layer neuron i of the target pulse extraction network is obtained by the following formulas:

$$v_{ji}^{k+1} = \beta v_{ji}^k + \eta \Delta w_{ji}^k$$

$$w_{ji}^{k+1} = w_{ji}^k + v_{ji}^{k+1}$$

where, k represents the number of iterations; β represents a momentum coefficient, and β∈[0,1]; η represents a learning rate; and $v_{ji}^k$ represents a speed vector used for each iteration update.

When the remote supervised method with Nesterov's accelerated gradient is used, the weight $w'^{k+1}_{ji}$ between the output layer neuron j and the input layer neuron i of the target pulse extraction network is obtained by the following formulas:

$$v'^{k+1}_{ji} = \beta v'^k_{ji} + \eta \Delta w'^k_{ji}|_{w'^k_{ji} = w'^k_{ji} + \beta v'^k_{ji}}$$

$$w'^{k+1}_{ji} = w'^k_{ji} + v'^{k+1}_{ji}$$

where, $\Delta w'^k_{ji}|_{w'^k_{ji} = w'^k_{ji} + \beta v'^k_{ji}}$ represents a weight update at $w'^k_{ji} + \beta v'^k_{ji}$.

In some preferred embodiments, in step S50, the step of "converting the target pulse into the time-frequency representation of the target speech to obtain the target speech by the inverse short-time Fourier transform" includes:

step S51, converting the target pulse into an information masking corresponding to the target pulse to obtain a masking value corresponding to the information masking;

step S52, performing a dot product on the masking value and the first overlapping speech signal, and adding phase information of the first overlapping speech signal to obtain a time-frequency signal representation of the target speech;

step S53, converting the time-frequency signal representation of the target speech into speech information by the inverse short-time Fourier transform to obtain the target speech.

According to another aspect of the present disclosure, a speech extraction system based on the supervised learning auditory attention includes an acquisition module, a conversion module, a sparse mapping module, a pulse conversion module, a target pulse extraction module, a pulse recognition module, and an output module.

The acquisition module is configured to acquire and input the original overlapping speech signal.

The conversion module is configured to convert the original overlapping speech signal into the two-dimensional time-frequency signal representation by the short-time Fourier transform to obtain the first overlapping speech signal.

The sparse mapping module is configured to perform the first sparsification on the first overlapping speech signal, map the intensity information of the time-frequency unit of the first overlapping speech signal to the preset D intensity levels, and perform the second sparsification on the first overlapping speech signal based on the information of the intensity levels to obtain the second overlapping speech signal.

The pulse conversion module is configured to convert the second overlapping speech signal into the pulse signal by the time coding method.

The target pulse extraction module is configured to extract the target pulse from the pulse signal by the trained target pulse extraction network.

The pulse recognition module is configured to convert the target pulse into the time-frequency representation of the target speech to obtain the target speech by the inverse short-time Fourier transform.

The output module is configured to output the target speech.

According to the third aspect of the present disclosure, a plurality of programs are stored in a storage device, and the plurality of programs are configured to be loaded and executed by a processor to achieve the speech extraction method based on the supervised learning auditory attention mentioned above.

According to the fourth aspect of the present disclosure, a processing device includes a processor and a storage device; the processor is configured to execute a plurality of programs; the storage device is configured to store the plurality of programs; the plurality of programs are configured to be loaded and executed by the processor to achieve the speech extraction method based on the supervised learning auditory attention mentioned above.

The advantages of the present disclosure are as follows:

(1) In the present disclosure, in consideration of the plenty temporal and spatial structure of the speech signal, the time coding method is designed to encode the intensity information of the overlapping speech signal, and the spiking neural network is configured to learn the mapping from the input pulse sequence of the overlapping speech to the output pulse sequence of the target speech, which effectively improves the accuracy of speech separation.

(2) In the present disclosure, the time coding method is employed to encode the overlapping speech information, the plenty temporal and spatial information of the speech is retained to some extent, which effectively improves the accuracy of speech separation of the spiking neural network.

(3) In the present disclosure, the spiking neural network capable of processing time series data is applied to speech separation, so that the spiking neural network has the capability of processing complex overlapping speech by supervised learning.

(4) In the present disclosure, the momentum and the Nesterov accelerated gradient are introduced into the remote supervised method, and the spiking neural network is trained by the improved remote supervised method, which greatly improves the convergence speed of the spiking neural network and can find an optimal solution.

BRIEF DESCRIPTION OF THE DRAWINGS

Other features, objectives, and advantages of the present application will be expressly described hereinafter with reference to the non-limiting embodiments and the drawings.

DETAILED DESCRIPTION OF THE EMBODIMENTS

Figure 1:
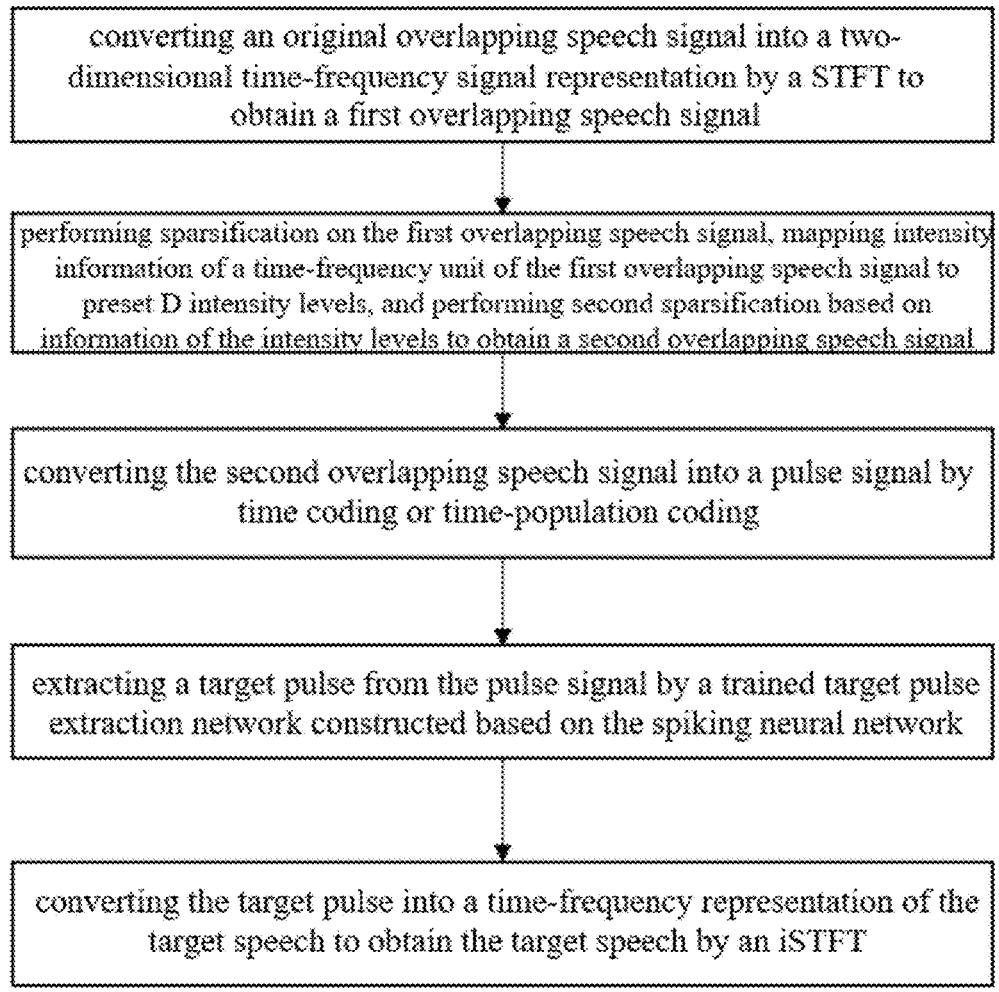
FIG. 1 is a schematic flow chart showing the speech extraction method based on the supervised learning auditory attention of the present disclosure.
Figure 2:
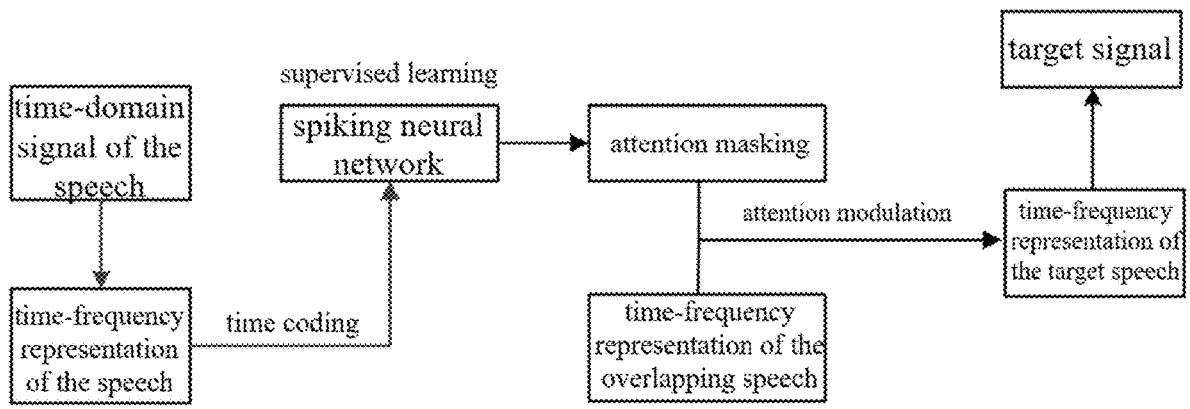
FIG. 2 is a schematic block diagram showing the speech extraction method based on the supervised learning auditory attention of the present disclosure.

The present disclosure will be further described hereinafter with reference to the drawings and embodiments. It should be understood that the specific embodiments described herein are only intended to illustrate the present disclosure rather than limiting the present disclosure. It should be noted that, in order to facilitate the description, only the parts related to the present disclosure are shown in the drawings.

It should be noted that, the embodiments of the present disclosure and the features of the embodiments can be combined with one another without conflicts. The present disclosure will be expressly described hereinafter with reference to the drawings and embodiments.

In the present disclosure, the speech extraction method based on the supervised learning auditory attention is used to perform auditory attention on the overlapping speech and extract the target speech. In the speech extraction method, in consideration of the plenty temporal and spatial structure of the speech signal, the time coding method is designed to encode the intensity information of the overlapping speech signal, and the spiking neural network is configured to learn the mapping from the input pulse sequence of the overlapping speech to the output pulse sequence of the target speech. The supervised learning algorithm is used for learning the weight of the spiking neural network of the speech extraction method. The speech extraction method introduces the momentum and the Nesterov accelerated gradient into the remote supervised method by limiting the neuron model of the spiking neural network as a linear neuron model, and the improved remote supervision method is employed to perform supervised learning on the spiking neural network to accelerate the convergence process and further improve the accuracy of speech separation.

The speech extraction method based on the supervised learning auditory attention of the present disclosure includes:

Step S10, the original overlapping speech signal is converted into a two-dimensional time-frequency signal representation by a short-time Fourier transform to obtain the first overlapping speech signal.

Step S20, the first sparsification is performed on the first overlapping speech signal, the intensity information of the time-frequency unit of the first overlapping speech signal is mapped to the preset D intensity levels, and the second sparsification is performed on the first overlapping speech signal based on the information of the intensity levels to obtain the second overlapping speech signal.

Step S30, the second overlapping speech signal is converted into a pulse signal by the time coding method; wherein the time coding method includes time-rate coding or time-population coding.

Step S40, the target pulse is extracted from the pulse signal by the trained target pulse extraction network; wherein the trained target pulse extraction network is constructed based on the spiking neural network.

Step S50, the target pulse is converted into a time-frequency representation of the target speech, and the target speech is obtained by an inverse short-time Fourier transform.

In order to clearly describe the speech extraction method based on the supervised learning auditory attention of the present disclosure, the steps in the embodiment of the speech extraction method will be expressly described hereinafter with reference to FIG. 1.

According to an embodiment of the present disclosure, the speech extraction method based on the supervised learning auditory attention includes steps S10-S50 described as follows:

Step S10, the original overlapping speech signal is converted into a two-dimensional time-frequency signal representation by a short-time Fourier transform to obtain the first overlapping speech signal.

Step S11, the original overlapping speech signal is resampled to reduce the sampling rate of the original overlapping speech signal. The resampling rate used in the embodiments of the present disclosure is 8 KHz.

Step S12, the resampled overlapping speech signal is encoded by the short-time Fourier transform; the speech signal is encoded into a matrix representation containing a time dimension and a frequency dimension; and each time-frequency set is used as a time-frequency unit.

Figure 3:
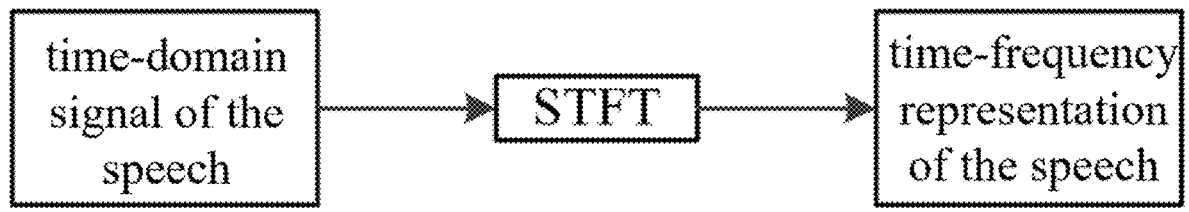
FIG. 3 is a schematic diagram showing the time-domain speech is converted into the time-frequency representation according to an embodiment of the speech extraction method based on the supervised learning auditory attention of the present disclosure.

As shown in FIG. 3, the time-domain signal of the speech is represented by the time amplitude and contains different speech information. The time-domain signal of the speech is encoded by the short-time Fourier transform (STFT) and is converted into a time-frequency representation. In the present embodiment, the window length of the STFT is 32 ms, a sine window function is used, and the length of Hop Size is 16 ms.

Step S20, the first sparsification is performed on the first overlapping speech signal; the intensity information of the time-frequency unit of the first overlapping speech signal is mapped to the preset D intensity levels; and the second sparsification is performed on the first overlapping speech signal based on the information of the intensity levels to obtain the second overlapping speech signal.

Step S21, based on the preset background noise threshold, a plurality of time-frequency units are selected from the time-frequency unit of the first overlapping speech signal to form the first time-frequency unit set; wherein the plurality of time-frequency units are greater than the preset background noise threshold; in the present embodiment, the background threshold is set as −40 dB.

Step S22, the K-means clustering is performed on the plurality of time-frequency units of the time-frequency unit set, and the plurality of time-frequency units of the first time-frequency unit set are mapped to the preset D intensity levels.

Step S23, the time-frequency unit with the lowest intensity level is set as a mute unit to obtain the second overlapping speech signal.

Step S30, the second overlapping speech signal is converted into a pulse signal by the time coding method.

Figure 4:
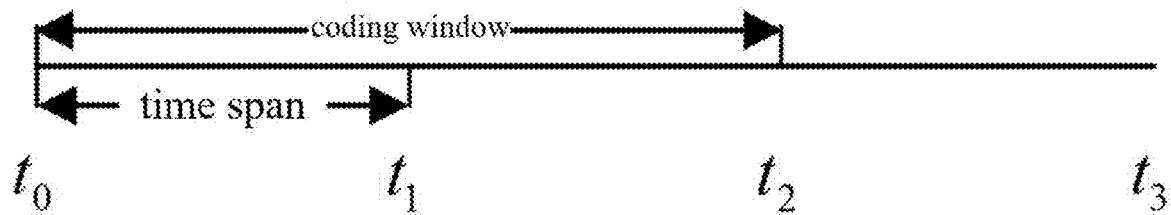
FIG. 4 is a schematic diagram showing the sliding time window according to an embodiment of the speech extraction method based on the supervised learning auditory attention of the present disclosure.

FIG. 4 shows a sliding coding window for time coding according to an embodiment of the present disclosure, and the length of the sliding coding window is twice the length of the time span; $t_0$, $t_1$, $t_2$, and $t_3$ represent four time points that are evenly distributed in the time dimension; $t_0$-$t_2$ and $t_1$-$t_3$ represent two adjacent coding windows; $t_0$-$t_1$, $t_1$-$t_2$ and $t_2$-$t_3$ represent the time span.

The time coding can adopt time-rate coding or time-population coding. According to an embodiment of the present disclosure, a schematic diagram shows two types of time coding method.

In time-rate coding, the number of pulses and the releasing time in the coding window are used to reflect the intensity of the time-frequency unit, and the intensity information of the time-frequency unit of the sparse overlapping speech is converted to a pulse signal that the spiking neural network can process.

The intensity level in the sparse mapping module is D; the time-frequency unit with the lowest intensity level is set as the mute unit; intensities of the plurality of time-frequency units are mapped to an intensity of 0<d<D after being subjected to the K-means clustering, where d is an integer; the time-frequency unit $(t_0, f_0)$ corresponds to a time window of the neuron i, wherein the time window has a starting time of $t_0$; the time span is $\Delta t$; then, a pulse is respectively released at $$t_0 + \frac{\Delta t}{d} * l, l = 0, 1, \ldots, d-1$$

within the time span in the coding window having the starting time of $t_0$, and a total of d pulses are released.

Figure 5:
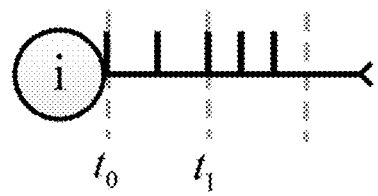
FIG. 5 is a schematic diagram showing the time-rate coding according to an embodiment of the speech extraction method based on the supervised learning auditory attention of the present disclosure.

FIG. 5 is a schematic diagram showing the time-rate coding according to an embodiment of the present disclosure. The intensity of time-rate coding is encoded in a time span corresponding to the first half of the coding window of the neuron. The dashed line in FIG. 5 denotes the boundary of the time span. Assuming the time duration of the coding window is 24 ms, then the time duration of the time span is 12 ms, and the total intensity level D=4. Since the time-frequency unit with the lowest intensity is set as the mute unit, there are only three intensity levels of 1, 2, and 3. The frequency of the time-frequency unit with a current starting time of $t_0$ corresponds to the neuron i, the intensity level of the time-frequency unit is set as 2, then two pulses are evenly distributed within the time span having the starting time of $t_0$ at $t_0$ms and $(t_0+6)$ms; after that, the intensity of the time-frequency unit coded by the neuron i in the subsequent coding window having the starting time of $t_1$ is set as 3, and three pulses are evenly distributed within the time span having the starting time of $t_1$ at $t_1$ ms, $(t_1+4)$ ms, and $(t_1+8)$ ms.

In time-population coding, a plurality of neuronal populations are used to encode the intensity of the time-frequency unit, the pulses of the intensity information of the time-frequency unit are distributed in the coding windows of neurons corresponding to the plurality of neuronal populations, and the intensity information of the time-frequency unit of the sparse overlapping speech is converted to a pulse signal that the spiking neural network can process.

Population coding is an important coding strategy found in neuroscience, which mainly uses multiple imprecise neurons to encode stimuli. Time-population coding, inspired by time coding and population coding, uses multiple neuronal populations to encode the intensity of the time-frequency unit. Specifically, the pulses representing the intensity of the time-frequency unit are distributed in the coding windows of neurons corresponding to the plurality of neuronal populations.

The intensity level in the sparse mapping module is D; the time-frequency unit with the lowest intensity level is set as the mute unit; the time-population coding uses D−1 neuronal populations to perform coding; the intensities of the plurality of time-frequency units are mapped to the intensity of 0<d<D after being subjected to the K-means clustering, where d is an integer; the time-frequency unit $(t_0, f_0)$ corresponds to the time window of the neuron i in each neuronal population, wherein the time window has a starting time of $t_0$; the neurons, $i \in P_l$, l=1, 2, . . . , d, respectively release a pulse at the starting time $t_0$ of the time window, and a total of d pulses are released, wherein $P_l$ represents the $l^{th}$ neuronal population.

Figure 6:
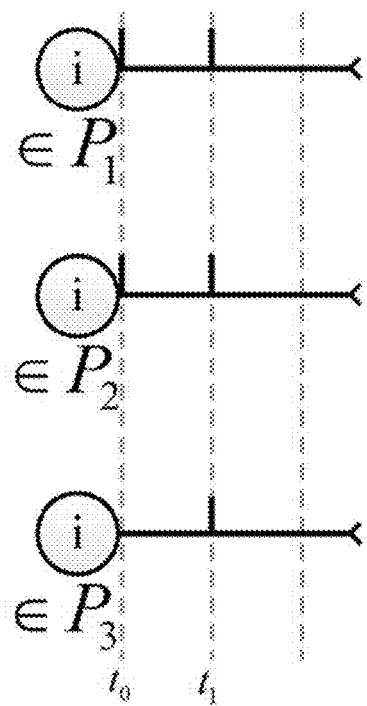
FIG. 6 is a schematic diagram showing the time-population coding according to an embodiment of the speech extraction method based on the supervised learning auditory attention of the present disclosure.

FIG. 6 is a schematic diagram showing the time-population coding according to an embodiment of the present disclosure. The intensity of the time-population coding is encoded in the time span corresponding to the first half of the coding window of the neuron. The dashed line in FIG. 6 denotes the boundary of the time span, and $P_d$ in FIG. 6 denotes the $d^{th}$ neuronal population. In time-population coding, the plurality of neuronal populations are configured to encode stimuli. Assuming the total intensity level D=4, since the time-frequency unit with the lowest intensity is set as a mute unit, there are only three intensity levels of 1, 2, and 3, and three neuronal populations are configured to encode the stimuli. The frequency of the time-frequency unit with the current starting time of $t_0$ corresponds to the neuron i in each neuronal population; the intensity of the time-frequency unit is set as 2; each of the neurons i in the first two neuronal populations releases a pulse at $t_0$, while the neuron i in the third neuronal population is mute at $t_0$; after that, the intensity of the time-frequency unit coded by the neuron i in the subsequent coding window having the starting time of $t_1$ is set as 3, and each of the neurons i in the three neuronal populations releases a pulse at $t_1$.

Step S40, the target pulse is extracted from the pulse signal by the trained target pulse extraction network.

Figure 7:
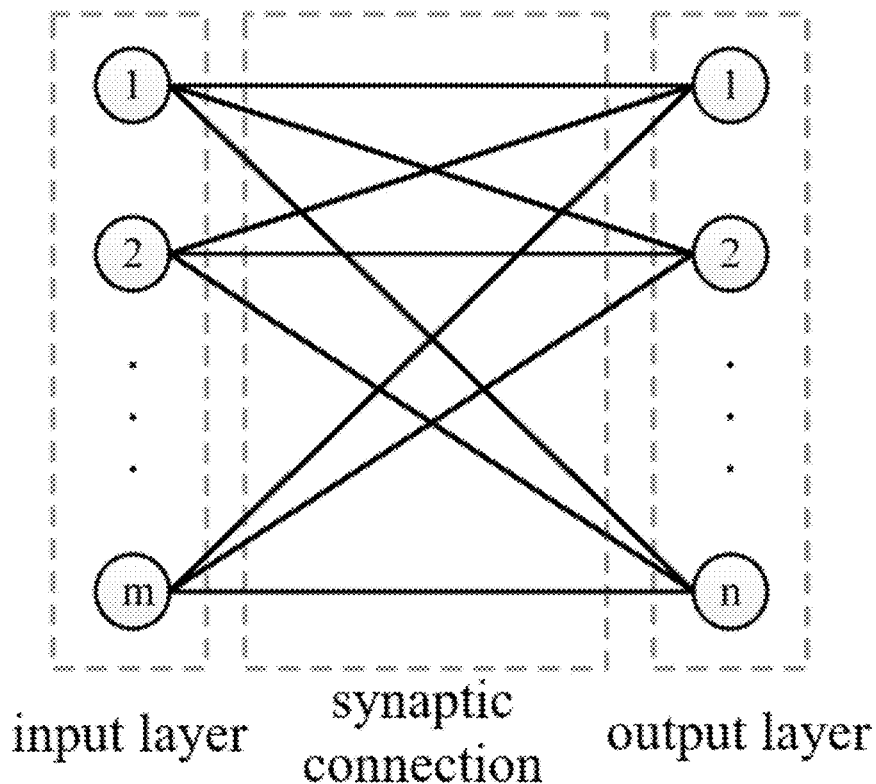
FIG. 7 is a schematic diagram showing the spiking neural network according to an embodiment of the speech extraction method based on the supervised learning auditory attention of the present disclosure.

The target pulse extraction network is a two-layer fully connected spiking neural network constructed by a stochastic linear neuron model, as shown in FIG. 7.

In the embodiments of the present disclosure, the leaky integrate-and-fire (LIF) neuron model $V_j(t)$ is defined by formula (1):

$$V_j(t) = \sum_{i \in \Gamma_j} w_{ji} \sum_f \varepsilon(t-t_i^f) + V_{rest} \quad (1)$$

where, $\Gamma_j$ represents a set of presynaptic neurons of the neuron j, $w_{ji}$ represents the weight of the synaptic connection between the neuron j and the neuron i, $t_i^f$ represents the pulse releasing time of the neuron i, $\varepsilon(t)$ represents the pulse response function, and $V_{rest}$ represents the resting potential.

$\varepsilon(t)$ is a simple α-function, as shown in formula (2):

$$\varepsilon(t) = \frac{t}{\tau} \exp\left(1 - \frac{t}{\tau}\right) H(t) \quad (2)$$

where, τ represents a time constant and determines the rate of ascent or descent of the postsynaptic potential; H(t) represents the Heaviside function; $\tau_{ref}$ represents the refractory period, and denotes a period of time, wherein when an accumulation of the membrane potential reaches the threshold potential $V_{thre}$, the neuron returns to the resting potential $V_{rest}$ and is maintained for the period of time.

In the present embodiment, $V_{thre}$=1.0, $V_{rest}$=0; when the time coding is time-rate coding, τ=0.6, $\tau_{ref}$=0.8, $\tau_{win}$=0.8, D=8; when the time coding is time-population coding, τ=0.45, $\tau_{ref}$=0.8, $\tau_{win}$=0.7, D=10.

The structure of the spiking neural network is related to the time coding method. When the time coding method is time-rate coding, the number m of input layer neurons and the number n of output layer neurons are both F; wherein F represents the frequency dimension of the time-frequency representation $X_{t,f}$; when the time coding method is time-population coding, the number m of neurons is (D−1)F, and the number n of output layer neurons is F.

The weights of the target pulse extraction network are trained by the remote supervised method.

The weight between the output layer neuron j and the input layer neuron i of the target pulse extraction network at the time t is shown in formula (3):

$$\Delta w_{ji}(t) = [S_j^d(t) - S_j^a(t)][a + \int_0^\infty W(s) S_i(t-s) ds] \quad (3)$$

where, $S_j^d(t)$, $S_j^a(t)$, and $S_i(t)$ respectively represent an expected output pulse sequence, an actual output pulse sequence, and an input pulse sequence; a represents a non-Hebbian term; W(s) represents a learning window; and the weight of the target pulse extraction network is obtained by integrating $\Delta w_{ji}$ over time.

The learning window W(s) is defined by formula (4):

$$W(s) = \begin{cases} +A \cdot \exp\left(-\frac{s}{\tau_{win}}\right), & s > 0 \\ 0, & s \leq 0 \end{cases} \quad (4)$$

where, s represents a time span between a releasing time of a postsynaptic pulse and a releasing time of a presynaptic pulse; A represents an amplitude, and A>0; and $\tau_{win}$ represents a time constant of the learning window.

If, and only if, the neuron model is limited to the stochastic linear neuron model, the remote supervised method can be derived from another angle, and such a derivation process is similar to a stochastic gradient descent. The employed remote supervised method is a remote supervised method with momentum or a remote supervised method with Nesterov's accelerated gradient.

When the remote supervised method with momentum is used, the weight $w_{ji}^{k+1}$ between the output layer neuron j and the input layer neuron i of the target pulse extraction network is obtained by formula (5) and formula (6):

$$v_{ji}^{k+1} = \beta v_{ji}^k + \eta \Delta w_{ji}^k \quad (5)$$

$$w_{ji}^{k+1} = w_{ji}^k + v_{ji}^{k+1} \quad (6)$$

where, k represents the number of iterations; β represents a momentum coefficient, and β∈[0,1]; η represents a learning rate; and $v_{ji}^k$ represents a speed vector used for each iteration update. In the present embodiment, β=0.9.

When the remote supervised method with Nesterov's accelerated gradient is used, the weight $w'^{k+1}_{ji}$ between the output layer neuron j and the input layer neuron i of the target pulse extraction network is obtained by formula (7) and formula (8):

$$v'^{k+1}_{ji} = \beta v'^{k}_{ji} + \eta \Delta w'^{k}_{ji}|_{w'^{k}_{ji} = w'^{k}_{ji} + \beta v'^{k}_{ji}} \quad (7)$$

$$w'^{k+1}_{ji} = w'^{k}_{ji} + v'^{k+1}_{ji} \quad (8)$$

where, $\Delta w'^{k}_{ji}|_{w'^{k}_{ji} = w'^{k}_{ji} + \beta v'^{k}_{ji}}$ represents a weight update at $w'^{k}_{ji} = \beta v'^{k}_{ji}$. In the present embodiment, $\beta = 0.9$.

In the present embodiment, the initial learning rate of the spiking neural network is 0.05. If the distance between the desired output pulse sequence and the actual output pulse continuously increases within 5 epochs, the learning rate is adjusted by a factor of 0.95. The early stopping strategy with a patience of 15 epochs (iterations) is employed. The stochastic gradient descent (SGD), the stochastic gradient descent with momentum (SGDM), and the Nesterov's accelerated gradient (NAG) are used for optimizing the artificial neural network.

Step S50, the target pulse is converted into a time-frequency representation of the target speech, and the target speech is obtained by an inverse short-time Fourier transform.

Step S51, the target pulse is converted into an information masking corresponding to the target pulse to obtain a masking value corresponding to the information masking.

The output pulse sequence predicted by the spiking neural network is converted into the information masking $A_{t,f}$ corresponding to the target according to a preset rule, wherein the dimension of $A_{t,f}$ is the same as the dimension of the time-frequency representation of the first overlapping speech. In the embodiment of the present disclosure, the ideal binary masking (IBM) is used, when a pulse is released within a certain time span of a neuron, the corresponding information masking unit is set as 1, otherwise the information masking unit is set as 0.

Step S52, a dot product is performed on the masking value and the first overlapping speech signal, and the phase information of the first overlapping speech signal is added to obtain a time-frequency signal representation of the target speech.

Step S53, the time-frequency signal representation of the target speech is converted into speech information by the inverse short-time Fourier transform to obtain the target speech.

Figure 8:
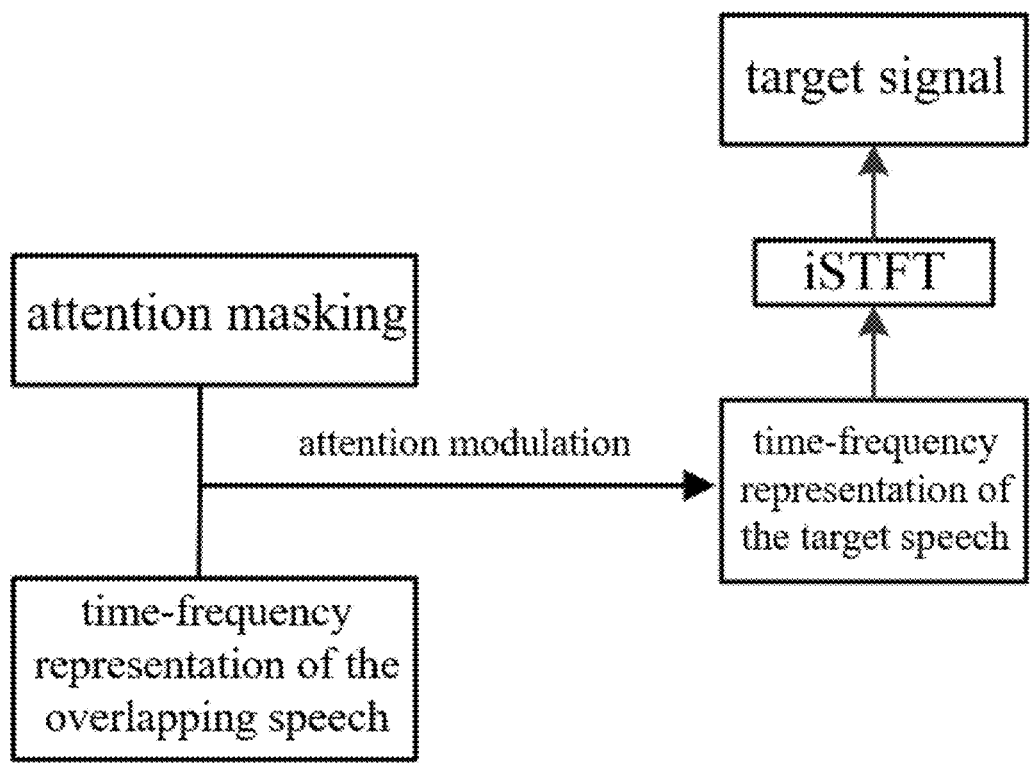
FIG. 8 is a schematic diagram showing the speech output unit according to an embodiment of the speech extraction method based on the supervised learning auditory attention of the present disclosure.

FIG. 8 is a schematic diagram showing the output of the target speech according to an embodiment of the speech extraction method based on the supervised learning auditory attention of the present disclosure. The overlapping speech signal is converted into a time-frequency representation, and the time-frequency representation of the target speech is extracted through the learning of the spiking neural network. Finally, the time-frequency signal representation is converted into a time-amplitude representation of the speech information by the inverse short-time Fourier transform, which is the extracted target speech.

In order to accurately evaluate the performance of the target speech separation method of the present disclosure, the global signal-to-distortion improvement (GNSDR) of the authoritative BSS EVAL tool set in speech separation is used as an indicator to measure the performance of speech separation of the model.

In the present disclosure, the Grid corpus, an English speech data set, is used in the experiment. Two speakers, including a male speaker and a female speaker, are selected from the data set of the Grid corpus, and twenty speeches are randomly selected. The twenty speeches are divided into three parts, ten of the twenty speeches are used to generate overlapping speeches of the training set, five of the twenty speeches are used to generate overlapping speeches of the validation set, and five of the twenty speeches are used to generate overlapping speeches of the test set. Finally, the training set includes 100 samples in total, the validation set includes 25 samples, and the test set includes 25 samples. Each sample is clipped to 0.5 s for aligning.

In order to illustrate the effectiveness of the time-rate (TR) coding and time-population coding (TP) of the present disclosure, in the above-mentioned data set, a comparison experiment is performed between the time-rate coding and time-population coding and the traditional time-to-first-spike (TF) coding under the same network structure parameter settings. In the time-to-first-spike coding, the intensity information is encoded by the time at which the single pulse is released in the coding window. The earlier the pulse is released, the greater the intensity is.

In order to illustrate the effectiveness of the remote supervised method with momentum and the remote supervised method with Nesterov's accelerated gradient described in the present disclosure, in the above-mentioned data set, a comparison experiment is performed between the remote supervised method with momentum and remote supervised method with Nesterov's accelerated gradient and the simple remote supervised method (ReSuMe) under various experimental settings.

In order to illustrate the effectiveness of the speech extraction method based on the supervised learning auditory attention of the present disclosure, in the above-mentioned data set, a comparison experiment is performed between the multi-layer perceptron (MLP), the recurrent neural network (RNN), the long-short term memory network (LSTM), and the speech extraction method of the present disclosure. The artificial neural network uses the time-frequency representation obtained in step S10 as an input, and an ideal ratio masking (IRM) is used in step S51. The artificial neural network using the IRM is more effective than the artificial neural network using the IBM.

The traditional time-to-first-spike coding is oversimplified and only uses a single pulse to represent the intensity of the time-frequency unit, which is susceptible to noise interference. The time-rate coding and time-population coding of the present disclosure show a significant improvement in the performance compared with the traditional time-to-first-spike coding.

By the comparison between the ReSuMe, the ReSuMe-M, and the ReSuMe-NAG, it can be found that, after the momentum and the Nesterov accelerated gradient are introduced into the remote supervised method, the model of the present disclosure jumps out of the local extreme value, and can find an optimal solution, which improves the accuracy of speech extraction.

By the comparison between the performance of the spiking neural network and the artificial neural network, the performance of the method of the present disclosure is superior to the artificial neural network under the same network parameters in most settings, which indicates a potential superiority of spiking neural networks in processing time series data.

The comparison results are shown in Table 1:

TABLE 1

| Method | SNN(TF) | SNN (TR) | SNN (TP) |
|---|---|---|---|
| ReSuMe | 1.81 ± 0.31 | 3.71 ± 0.32 | 4.04 ± 0.27 |
| ReSuMe-M | 2.16 ± 0.21 | 4.03 ± 0.29 | 4.41 ± 0.29 |
| ReSuMe-NAG | 2.20 ± 0.24 | 4.54 ± 0.23 | 4.23 ± 0.20 |

TABLE 1-continued

| Method | MLP | RNN | LSTM |
|---|---|---|---|
| SGD | 3.70 ± 0.07 | 3.56 ± 0.06 | 3.80 ± 0.03 |
| SGDM | 3.72 ± 0.07 | 3.58 ± 0.05 | 3.94 ± 0.07 |
| NAG | 3.74 ± 0.06 | 3.58 ± 0.05 | 3.94 ± 0.06 |

Figure 9:
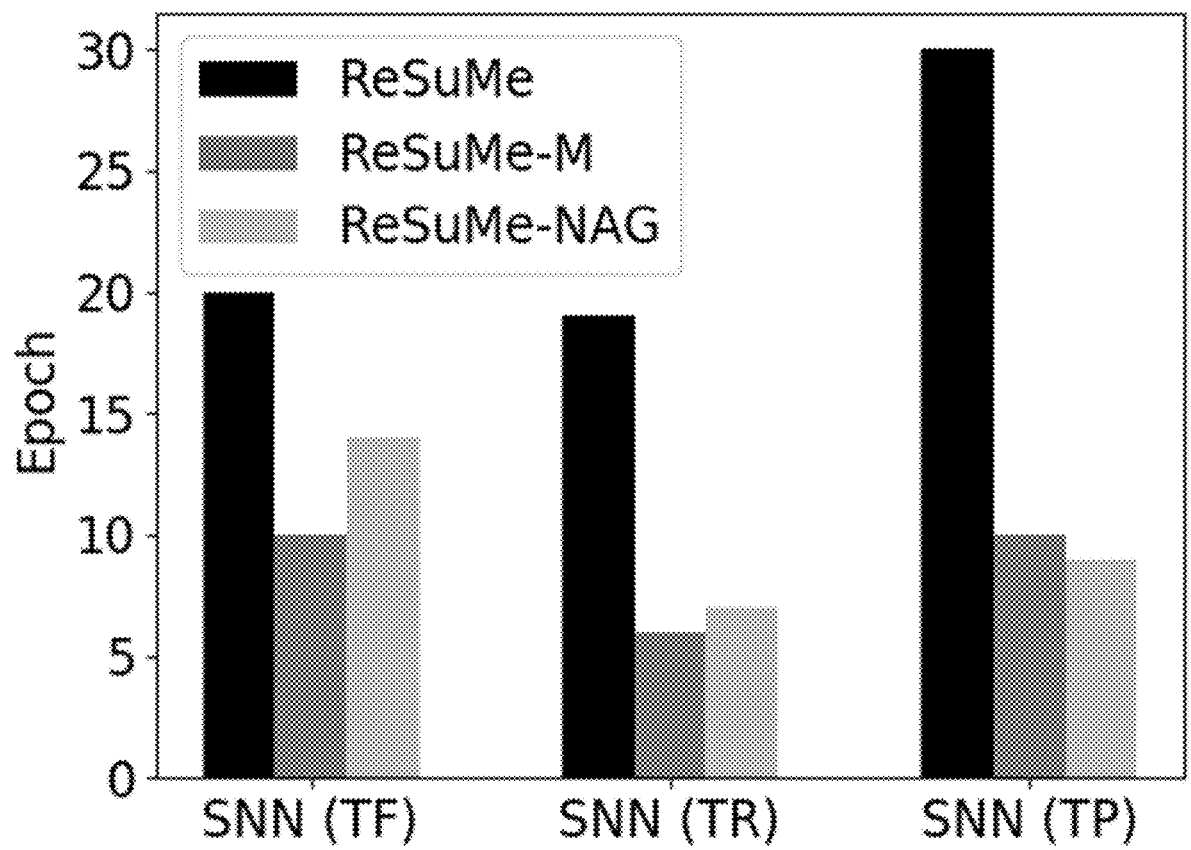
FIG. 9 is a schematic diagram showing the learning convergence speed under various experimental settings according to an embodiment of the speech extraction method based on the supervised learning auditory attention of the present disclosure.

As shown in FIG. 9, according to the learning convergence speed of the method of the present disclosure under various experimental settings, after the momentum and the Nesterov accelerated gradient are introduced to the remote supervised method, the convergence process of learning of the pulse sequence is significantly accelerated, which shows the effectiveness of the supervised learning algorithms (i.e., the ReSuMe-M and the ReSuMe-NAG).

According to the second embodiment of the present disclosure, the speech extraction system based on the supervised learning auditory attention includes an acquisition module, a conversion module, a sparse mapping module, a pulse conversion module, a target pulse extraction module, a pulse recognition module, and an output module.

The acquisition module is configured to acquire and input the original overlapping speech signal.

The conversion module is configured to convert the original overlapping speech signal into the two-dimensional time-frequency signal representation by the short-time Fourier transform, and to obtain the first overlapping speech signal.

The sparse mapping module is configured to perform the first sparsification on the first overlapping speech signal, map the intensity information of the time-frequency unit of the first overlapping speech signal to the preset D intensity levels, and perform the second sparsification on the first overlapping speech signal based on the information of the intensity levels to obtain the second overlapping speech signal.

The pulse conversion module is configured to convert the second overlapping speech signal into the pulse signal by the time coding method.

The target pulse extraction module is configured to extract the target pulse from the pulse signal by the trained target pulse extraction network.

The pulse recognition module is configured to convert the target pulse into the time-frequency representation of the target speech to obtain the target speech by the inverse short-time Fourier transform.

The output module is configured to output the target speech.

Those skilled in the art can clearly understand that, for the convenience and brevity of description, the specific working process and descriptions related to the system described above can refer to the corresponding process in the above-mentioned embodiments, which are not repeatedly described herein.

It should be noted that, in the speech extraction system based on the supervised learning auditory attention, the partition of the functional modules is merely used for illustration in the above-mentioned embodiments. In practical applications, the above-mentioned function allocation can be completed by different functional modules according to the requirements, i.e., the modules or steps in the embodiments of the present disclosure are decomposed or combined. For example, the modules in the above-mentioned embodiments can be combined into one module, or further divided into multiple sub-modules to achieve all or part of the functions described above. The designations of the modules and steps involved in the embodiments of the present disclosure are only intended to distinguish these modules or steps, and are not construed as an inappropriate limit to the present disclosure.

According to the third embodiment of the present disclosure, a plurality of programs are stored in a storage device, and the plurality of programs are configured to be loaded and executed by a processor to achieve the speech extraction method based on the supervised learning auditory attention mentioned above.

According to the fourth embodiment of the present disclosure, a processing device includes a processor and a storage device; the processor is configured to execute a plurality of programs; the storage device is configured to store the plurality of programs; the plurality of programs are configured to be loaded and executed by the processor to achieve the speech extraction method based on the supervised learning auditory attention mentioned above.

Those skilled in the art can clearly understand that, for the convenience and brevity of description, the specific working process and descriptions related to the storage device and processing device described above can refer to the corresponding processes in the above-mentioned embodiments, which are not repeatedly described herein.

Those skilled in the art should be able to realize that the modules, methods, and steps described in the embodiments disclosed herein can be realized by electronic hardware, computer software, or a combination of electronic hardware and computer software. The programs corresponding to software modules, methods and steps can be stored in a random access memory (RAM), a memory, a read-only memory (ROM), an electrically programmable ROM, an electrically erasable programmable ROM, a register, a hard disk, a removable disk, a CD-ROM or any other form of storage media disclosed in the art. In order to clearly illustrate the interchangeability of electronic hardware and software, the composition and steps of each embodiment is described in terms of functions in the above-mentioned descriptions. Whether these functions are performed by electronic hardware or software depends on the specific application and design constraints of the technical solution. Those skilled in the art can use different methods to achieve the described functions for each specific application, while such implementation should not be construed as falling outside the scope of the present disclosure.

The terminologies "up", "down", "front", "rear", "left", "right", and the like are only the directions with reference to the drawings, which are not intended to limit the scope of protection of the present disclosure.

The terminologies "first", "second", and the like are used to distinguish similar objects rather than describing or indicating a particular order or sequence.

The terminology "include" or any other similar terminologies are intended to cover a non-exclusive inclusion, so that a process, method, article, device or apparatus including a series of elements not only includes those elements, but also includes other elements not explicitly listed, or further includes elements inherent to the process, method, article, device or apparatus.

Hereto, the technical solution of the present disclosure is described with reference to the preferred embodiments and the drawings. However, those skilled in the art can easily understand that the scope of protection of the present disclosure is not limited to these specific embodiments. Those skilled in the art can make equivalent modifications or replacements to related technical features without departing from the principle of the present disclosure, and the technical solutions obtained by these modifications or replacements would fall within the scope of protection of the present disclosure.

What is claimed is:

1. A speech extraction method based on a supervised learning auditory attention, comprising:

step S10, converting an original overlapping speech signal into a two-dimensional time-frequency signal representation by a short-time Fourier transform to obtain a first overlapping speech signal;

step S20, performing a first sparsification on the first overlapping speech signal, mapping intensity information of a time-frequency unit of the first overlapping speech signal to preset D intensity levels, and performing a second sparsification on the first overlapping speech signal based on information of the preset D intensity levels to obtain a second overlapping speech signal;

step S30, converting the second overlapping speech signal into a pulse signal by a time coding method; wherein the time coding method comprises a time-rate coding method or a time-population coding method;

step S40, extracting a target pulse from the pulse signal by a target pulse extraction network;

wherein the target pulse extraction network is trained and constructed based on a spiking neural network; and step S50, converting the target pulse into a time-frequency representation of a target speech to obtain the target speech by an inverse short-time Fourier transform.

2. The speech extraction method based on the supervised learning auditory attention according to claim 1, wherein, in the step S10, the step of "converting the original overlapping speech signal into the two-dimensional time-frequency signal representation by the short-time Fourier transform" comprises:

step S11, resampling the original overlapping speech signal to reduce a sampling rate of the original overlapping speech signal to obtain a resampled overlapping speech signal; and step S12, encoding the resampled overlapping speech signal by the short-time Fourier transform; encoding the resampled overlapping speech signal into a matrix representation containing a time dimension and a frequency dimension; and using each time-frequency set as a time-frequency unit.

3. The speech extraction method based on the supervised learning auditory attention according to claim 1, wherein, in the step S20, the step of "performing the first sparsification on the first overlapping speech signal, mapping the intensity information of the time-frequency unit of the first overlapping speech signal to the preset D intensity levels, and performing the second sparsification on the first overlapping speech signal based on the information of the preset D intensity levels" comprises:

step S21, based on a preset background noise threshold, selecting a plurality of time-frequency units from the time-frequency unit of the first overlapping speech signal to form a first time-frequency unit set; wherein each of the plurality of time-frequency units is greater than the preset background noise threshold;

step S22, performing K-means clustering on the plurality of time-frequency units of the time-frequency unit set, and mapping the plurality of time-frequency units of the first time-frequency unit set to the preset D intensity levels; and step S23, setting a time-frequency unit with a lowest intensity level as a mute unit to obtain a second overlapping speech signal.

4. The speech extraction method based on the supervised learning auditory attention according to claim 1, wherein, the time-rate coding method comprises:

using a number of pulses and a releasing time in a coding window to reflect an intensity of the time-frequency unit; wherein an intensity level in a sparse mapping module is D; a time-frequency unit with a lowest intensity level is set as a mute unit; intensities of the plurality of time-frequency units are mapped to an intensity of 0<d<D after being subjected to K-means clustering, where d is an integer; the time-frequency unit $(t_0, f_0)$ corresponds to a time window of a neuron i, wherein the time window of the neuron i has a starting time of $t_0$; a time span is $\Delta t$; a pulse is respectively released at $$t_0 + \frac{\Delta t}{d} * l, l = 0, 1, \ldots, d-1$$

within the time span in the coding window, and a total of d pulses are released.

5. The speech extraction method based on the supervised learning auditory attention according to claim 4, wherein, a learning window W(s) is as follows:

$$W(s) = \begin{cases} +A \cdot \exp\left(-\frac{s}{\tau_{win}}\right) & , s > 0 \\ 0 & , s \leq 0 \end{cases}$$

where, s represents a time span between a releasing time of a postsynaptic pulse and a releasing time of a presynaptic pulse; A represents an amplitude of the learning window, and A>0; and $\tau_{win}$ represents a time constant of the learning window.

6. The speech extraction method based on the supervised learning auditory attention according to claim 4, wherein, a remote supervised method is a remote supervised method with a momentum or a remote supervised method is a remote supervised method with a Nesterov's accelerated gradient;

when the remote supervised method with the momentum is used, a weight $w_{ji}^{k+1}$ between an output layer neuron j and an input layer neuron i of the target pulse extraction network is obtained by the following formulas:

$$v_{ji}^{k+1} = \beta v_{ji}^k + \eta \Delta w_{ji}^k$$

$$w_{ji}^{k+1} = w_{ji}^k + v_{ji}^{k+1}$$

where, k represents a number of iterations; $\beta$ represents a momentum coefficient, and $\beta \in [0,1]$; $\eta$ represents a learning rate; and $v_{ji}^k$ represents a speed vector used for each of the iterations; and when the remote supervised method with the Nesterov's accelerated gradient is used, the weight $w'^{k+1}_{ji}$ between the output layer neuron j and the input layer neuron i of the target pulse extraction network is obtained by the following formulas:

$$v'^{k+1}_{ji} = \beta v'^k_{ji} + \eta \Delta w'^k_{ji}|_{w'^k_{ji}=w'^k_{ji}+\beta v'^k_{ji}}$$

$$w'^{k+1}_{ji} = w'^k_{ji} + v'^{k+1}_{ji}$$

where, $\Delta w'^k_{ji}|_{w'^k_{ji}=w'^k_{ji}+\beta v'^k_{ji}}$ represents a weight update at $w'^k_{ji} + \beta v'^k_{ji}$.

7. The speech extraction method based on the supervised learning auditory attention according to claim 1, wherein, the time-population coding method comprises:

using a plurality of neuronal populations to encode an intensity of the time-frequency unit; wherein pulses of the intensity information of the time-frequency unit are distributed in a plurality of coding windows of neurons corresponding to the plurality of neuronal populations; an intensity level in a sparse mapping module is D; a time-frequency unit with a lowest intensity level is set as a mute unit; the time-population coding method uses D−1 neuronal populations to perform coding; intensities of the plurality of time-frequency units are mapped to an intensity of 0<d<D after being subjected to K-means clustering, where d is an integer; the time-frequency unit ($t_0$, $f_0$) corresponds to a time window of a neuron i in each of D−1 neuronal populations, wherein the time window of the neuron i in the each of D−1 neuronal populations has a starting time of $t_0$; neurons i∈$P_l$, l=1, 2, ..., d respectively release a pulse at the starting time $t_0$ of the time window, and a total of d pulses are released, wherein $P_l$ represents an $l^{th}$ neuronal population of the plurality of neuronal populations.

8. The speech extraction method based on the supervised learning auditory attention according to claim 7, wherein, a remote supervised method is a remote supervised method with a momentum; or the remote supervised method is a remote supervised method with a Nesterov's accelerated gradient;

when the remote supervised method with the momentum is used, a weight $w_{ji}^{k+1}$ between an output layer neuron j and an input layer neuron i of the target pulse extraction network is obtained by the following formulas:

$$v_{ji}^{k+1}=\beta v_{ji}^k+\eta \Delta w_{ji}^k$$

$$w_{ji}^{k+1}=w_{ji}^k+v_{ji}^{k+1}$$

where, k represents a number of iterations; β represents a momentum coefficient, and β∈[0,1]; η represents a learning rate; and $v_{ji}^k$ represents a speed vector used for each of the iterations; and when the remote supervised method with the Nesterov's accelerated gradient is used, the weight $w'^{k+1}_{ji}$ between the output layer neuron j and the input layer neuron i of the target pulse extraction network is obtained by the following formulas:

$$v'^{k+1}_{ji}=\beta v'^k_{ji}+\eta \Delta w'^k_{ji}|_{w'^k_{ji}=w'^k_{ji}+\beta v'^k_{ji}}$$

$$w'^{k+1}_{ji}=w'^k_{ji}+v'^{k+1}_{ji}$$

where, $\Delta w'^k_{ji}|_{w'^k_{ji}=w'^k_{ji}+\beta v'^k_{ji}}$ represents a weight update at $w'^k_{ji}+\beta v'^k_{ji}$.

9. The speech extraction method based on the supervised learning auditory attention according to claim 1, wherein, the target pulse extraction network is a two-layer fully connected spiking neural network constructed by a stochastic linear neuron model; and a weight of the target pulse extraction network is trained by a remote supervised method; the weight $\Delta w_{ji}(t)$ between an output layer neuron j and an input layer neuron i of the target pulse extraction network at time t is obtained by the following formula:

$$\Delta w_{ji}(t)=[S_j^d(t)-S_j^a(t)][a+\int_0^\infty W(s)S_i(t-s)ds]$$

where, $S_j^d(t)$, $S_j^a(t)$, and $S_i(t)$ respectively represent an expected output pulse sequence, an actual output pulse sequence, and an input pulse sequence; a represents a non-Hebbian term; W(s) represents a learning window; and the weight of the target pulse extraction network is obtained by integrating $\Delta w_{ji}$ over time.

10. The speech extraction method based on the supervised learning auditory attention according to claim 1, wherein, in the step S50, the step of "converting the target pulse into the time-frequency representation of the target speech to obtain the target speech by the inverse short-time Fourier transform" comprises:

step S51, converting the target pulse into an information masking corresponding to the target pulse to obtain a masking value corresponding to the information masking;

step S52, performing a dot product on the masking value and the first overlapping speech signal, and adding phase information of the first overlapping speech signal to obtain a time-frequency signal representation of the target speech; and step S53, converting the time-frequency signal representation of the target speech into speech information by the inverse short-time Fourier transform to obtain the target speech.

* * * * *